US012391906B2

(12) United States Patent
Naqvi

(10) Patent No.: US 12,391,906 B2
(45) **Date of Patent: *Aug. 19, 2025**

(54) STABLE ANHYDROUS CLEANSER CONCENTRATE FORMULATION AND METHOD OF MAKING SAME

(71) Applicant: ONE HOME BRANDS, INC., New York, NY (US)

(72) Inventor: Syed Humza Naqvi, Walnut Creek, CA (US)

(73) Assignee: One Home Brands, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,934

(22) Filed: Jul. 30, 2022

(65) Prior Publication Data

US 2023/0193170 A1 Jun. 22, 2023

Related U.S. Application Data

(63) Continuation of application No. 16/796,433, filed on Feb. 20, 2020, now Pat. No. 11,401,488.

(60) Provisional application No. 62/929,598, filed on Nov. 1, 2019, provisional application No. 62/929,572, filed on Nov. 1, 2019, provisional application No. 62/929,588, filed on Nov. 1, 2019, provisional application No. 62/836,325, filed on Apr. 19, 2019, provisional application No. 62/836,390, filed on Apr. 19, 2019, provisional application No. 62/836,245, filed on Apr. 19, 2019, provisional application No. 62/808,021, filed on Feb. 20, 2019.

(51) Int. Cl.

| | |
|---|---|
| ***C11D 17/00*** | (2006.01) |
| ***B08B 3/08*** | (2006.01) |
| ***C11D 1/14*** | (2006.01) |
| ***C11D 1/72*** | (2006.01) |
| ***C11D 1/722*** | (2006.01) |
| ***C11D 3/10*** | (2006.01) |
| ***C11D 3/20*** | (2006.01) |
| ***C11D 17/06*** | (2006.01) |

(52) U.S. Cl.

CPC .......... *C11D 17/0073* (2013.01); *C11D 1/146* (2013.01); *C11D 1/722* (2013.01); *C11D 3/10* (2013.01); *C11D 3/2086* (2013.01); *C11D 17/06* (2013.01)

(58) Field of Classification Search

None

See application file for complete search history.

(56) References Cited

U.S. PATENT DOCUMENTS

| | | | | |
|---|---|---|---|---|
| 5,336,500 | A | 8/1994 | Richter | |
| 5,505,938 | A | 4/1996 | Pocalyko et al. | |
| 5,741,520 | A | 4/1998 | Desenna | |
| 5,817,337 | A | 10/1998 | Desenna | |
| 5,958,454 | A | 9/1999 | Schrempf et al. | |
| 6,099,861 | A | 8/2000 | DeSenna et al. | |
| 6,310,014 | B1 | 10/2001 | Rau | |
| 6,645,474 | B1 | 11/2003 | Galdi | |
| 6,713,441 | B1 | 3/2004 | DeSenna et al. | |
| 7,163,692 | B2 * | 1/2007 | Lagatol | A61K 8/737 424/443 |
| 11,401,488 | B2 * | 8/2022 | Naqvi | C11D 1/146 |
| 2003/0003136 | A1 | 1/2003 | Bergquist | |
| 2003/0199077 | A1 | 10/2003 | Fano et al. | |
| 2004/0058843 | A1 | 3/2004 | Del Nunzio et al. | |
| 2004/0126411 | A1 | 7/2004 | Legatol et al. | |
| 2004/0127385 | A1 | 7/2004 | O'Neil | |
| 2004/0127388 | A1 | 7/2004 | Del Nunzio et al. | |
| 2005/0197275 | A1 | 9/2005 | Hsu et al. | |
| 2005/0250667 | A1 | 11/2005 | Quellet et al. | |
| 2005/0288208 | A1 * | 12/2005 | Keenan | C11D 3/3769 510/439 |
| 2006/0205626 | A1 * | 9/2006 | Gant | A01N 59/26 510/367 |
| 2008/0096784 | A1 * | 4/2008 | Barg | C11D 3/33 510/161 |
| 2009/0105111 | A1 | 4/2009 | Stolte et al. | |
| 2009/0169500 | A1 | 7/2009 | Sunkara | |
| 2010/0267599 | A1 | 10/2010 | Lucka et al. | |
| 2011/0039744 | A1 | 2/2011 | Heath et al. | |
| 2011/0105375 | A1 | 5/2011 | Myers et al. | |
| 2013/0338053 | A1 * | 12/2013 | Casco | C11D 3/40 510/109 |
| 2014/0174467 | A1 | 6/2014 | Larson et al. | |
| 2015/0366764 | A1 | 12/2015 | Batton | |
| 2016/0000848 | A1 | 1/2016 | Koganov et al. | |
| 2017/0172880 | A1 | 6/2017 | Lavender et al. | |
| 2018/0092357 | A1 | 4/2018 | Premachandran et al. | |
| 2018/0105766 | A1 | 4/2018 | Casco | |

(Continued)

FOREIGN PATENT DOCUMENTS

| | | | |
|---|---|---|---|
| CN | 1220306 | A | 6/1999 |
| CN | 103194330 | A | 7/2013 |

(Continued)

OTHER PUBLICATIONS

Office Action issued in corresponding Chinese Patent Application No. 202080029924.8 dated Feb. 18, 2023.

(Continued)

*Primary Examiner* — Lorna M Douyon

(74) *Attorney, Agent, or Firm* — Herbert Smith Freehills Kramer (US) LLP

(57) ABSTRACT

The invention relates to stable, anhydrous concentrated cleanser formulations.

20 Claims, No Drawings

(56) References Cited

U.S. PATENT DOCUMENTS

2020/0010402 A1* 1/2020 Chandrasekaran ..... C07C 67/12
2021/0009922 A1 1/2021 Klingman et al.
2021/0171865 A1* 6/2021 Pambou .................. C11D 1/83
2022/0202730 A1 6/2022 Basit et al.

FOREIGN PATENT DOCUMENTS

CN 105454291 A 4/2016
CN 106635474 A 5/2017
CN 106753932 A 5/2017
CN 107384602 A 11/2017
CN 107614670 A 1/2018
CN 108102794 A 6/2018
CN 108174855 A 6/2018
CN 110903920 A 3/2020
DE 10205134 A1 8/2003
DE 102005007293 A1 8/2006
DE 102006016575 A1 10/2007
EP 1102577 A 5/2001
EP 1479377 A1 11/2004
EP 1577375 A2 9/2005
EP 3299446 A1 3/2018
KR 20130032927 A 4/2013
KR 101425024 B1 8/2014
WO 2006-122103 A1 11/2006
WO 2013/013164 A1 1/2013
WO 2018/113643 A1 6/2018
WO 2018/125033 A1 7/2018
WO 2018-141074 A1 8/2018
WO 2019/018287 A1 1/2019
WO 2020/114679 A1 6/2020
WO 2020/172423 A1 8/2020
WO 2020-214916 A1 10/2020

OTHER PUBLICATIONS

Office Action issued in corresponding Chinese Patent Application No. 202080029960.4 dated Feb. 17, 2023.
International Search Report and Written Opinion mailed May 29, 2020 in International Application No. PCT/US2020/019061.
International Search Report and Written Opinion mailed Sep. 2, 2020 in International Application No. PCT/US2020/019058.
Office Action issued in corresponding Canadian Patent Application No. 3,130,953 dated Jun. 22, 2023.
Office Action issued in corresponding Chinese Patent Application No. 202080029960.4 dated Jun. 30, 2023.
Office Action issued in corresponding Canadian Patent Application No. 3,130,958 dated Apr. 11, 2023.
Combined Search and Examination Report issued May 19, 2020 in British Application No. 2002371.9.
Search Report mailed May 19, 2020 in British Application No. 2002371.9.
Examination report issued in corresponding AU Application No. 2020226741, dated Nov. 30, 2021.
Examination report issued in corresponding AU Application No. 2020225452, dated Dec. 1, 2021.
Non-Final Rejection issued in corresponding U.S. Appl. No. 16/796,438, dated Dec. 13, 2021.
Office Action issued in corresponding DE Application No. 10 2020 001 131.4, dated Oct. 25, 2021 w/Machine English Translation.
Office Action issued in corresponding DE Application No. 10 2020 001 130.6, dated Oct. 19, 2021 w/Machine English Translation.
Notice of Acceptance issued in corresponding AU Application No. 2020226741, dated Oct. 6, 2022.
Examination report issued in corresponding AU Application No. 2020225452, dated Nov. 3, 2022.
Williams, R. 'Preservatives used in personal case products', The Australian Society of Cosmetic Chemists [retrieved from the Internet on Oct. 27, 2022] URL: https://ascc.com.au/preservatives-used-in-personal-care-products-2/ Published Jan. 27, 2018.
Onza, Geogard UltraTM [retrieved from the Internet on Oct. 27, 2022] URL: https://glenncorp.com/wp-content/uploads/2018/02/2017_10_Geogard-Ultra_TDS_d11_LowRes.pdf.
USPTO—Office Action for U.S. Appl. No. 16/796,438 mailed on Dec. 19, 2023; 22 pgs.
Office Action issued in corresponding Australian Patent Application No. 2023200033 dated Oct. 9, 2023.
Anderson, F. Alan, "Annual Review of Cosmetic Ingredient Safety Assessments: 2005/2006." Int'l. J. of Toxicology, 27 (Suppl. 1): 77-142 (2008) 66 pgs. Retrieved on May 9, 2024 from https://cir-reports.cir-safety.org/view-attachment/?id=e4ce160b-8e74-ec11-8943-0022482f06a6.
Aroma Alternatives Ltd Co. "Ingredients to Die For—Gluconolactone & Sodium Benzoate (GSB)." Product Catalog, Preservatives / Integrity Stabilizers and Certificate of Analysis, Cosmetics, 2 pgs., 1999-2023. Retrieved on May 9, 2024 form https://www.ingredientstodiefor.com/item/Gluconolactone_Sodium_Benzoate_GSB_/565?category=32.
Aroma Alternatives Ltd Co. "Ingredients to Die For" Tech Sheet, Available on Oct. 22, 2014 from https://www.ingredientstodiefor.com/files/PotassiumSorbate.pdf 16 pages.
Ashland.com—"euxyl™ k 500 preservative chemistry: antimicrobials—INCI/Chemical Name: Diazolidinyl Urea (and) Sodium Benzoate (and) Potassium Sorbate (and) Aqua (Water)." (2024) 3 pgs. Retrieved on May 9, 2024 from https://www.ashland.com/industries/personal-and-home-care/hair-care/euxyl-k-500-preservative.
Chemrez Technologies, Inc.—"Foaming Liquid Hand Wash" (SLES System), No. PHC--PF-18-093-001, Technical Data Sheet, 1 page, Quezon City, Philippines (date unknown).
Cosmetics Info—"Sodium Benzoate" Data Sheet, Retrieved on Dec. 1, 2023 from https://www.cosmeticsinfo.org/ ingredient/sodium-benzoate/, 4 pages.
EUR-LEX—Leggissum "Safer Cosmetics for People in the ELJ", Summary of Regulation (EC) No. 1223/2009 on cosmetic products, Retrieved on Dec. 1, 2023 from Eur-Lex at https://eur-lex.europa.eu/iegal-content/EN/TXT/?uri=LEGGISSUM c:00013&print=true, 3 pages.
European Commission—Health & Consumer Protection Directorate-General "Scientific Committee on Consumer Products (SCCP)—Opinion on Benzoic Acid and Sodium Benzoate." Adopted by the SCCP during 4th plenary of Jun. 21, 2005. 30 pgs. Retrieved on May 9, 2024 from https://ec.europa.eu/health/ph_risk/committees/04_sccp/docs/sccp_o_015.pdf.
Johnson, Jr., W. et al., "Safety Assessment of Benzyl Alcohol, Benzoic Acid and its Salts, and Benzyl Benzoate." Int'l. J. of Toxicology, vol. 36 (Suppl. 3) 2017, pp. 5S-30S (26 pgs. ). Retrieved on May 9, 2024 from https://cir-reports.cir-safety.org/view-attachment?id=d7068126-8d74-ec11-8943-0022482f06a6.
Joint Food and Agriculture Organization (FAO) Expert Committee On Food Additives—Toxicological Evaluation of Some Antimicrobials, Antioxidants, Emulsifiers, Stabilizers, Flour-Treatment Agents, Acids, and Bases. FOA Nutrition Meetings Report Series No. 40A, B, C (1965-1966) 3 pgs. Retrieved on May 9, 2024 from https://www.inchem.org/documents/jecfa/jecmono/40abcj02.htm.
Joint Food and Agriculture Organization (FAO)/World Health Organization (WHO) Expert Committee on Food Additives. "IPCS Inchem—Benzoic Acid" —Compendium Addendum 12/FNP 52 Add. 12/67 (2004). 2 pgs. Retrieved on May 9, 2024 from https://www.inchem.org/documents/jecfa/jeceval/jec_184.htm.
Liebert, M. A., et al., "Final Report on the Safety Assessment of Sorbic Acid and Potassium Sorbate." J. of the Amer. College of Toxicology. vol. 7, No. 6, pp. 837-880 (1988) 44 pgs. Retrieved on May 9, 2024 from https://cir-reports.cir-safety.org/view-attachment?id=d7068126-8d74-ec11-8943-0022482f06a6.
Liu, Chuang, "Household Detergents." Chemical Industry Press, p. 29, Jun. 30, 2001.
Lonza, Geogard Ultra (TM)—Retrieved on Oct. 27, 2022 from URL: https://glenncorp.com/wp-content/uploads/2018/02/2017_10_Geogard-Ultra_TDS_d11_LowRes.pdf, 4 pages.
Lubrizol—"Luxurious Foaming Hand Soap" Product: Specification Sheet CL-H0029, Edition Jun. 14, 2016, 1 page, Advanced Materials, Inc., Cleveland, OH US.
Ma, Jianzhong, "Synthesis Principles and Application Technologies Of Leather Chemicals." Aug. 31, 2009, pp. 70 and 77, China.

(56) References Cited

OTHER PUBLICATIONS

Nair, Bindu, "Final Report on the Safety Assessment of Benzyl Alcohol, Benzoic Acid, and Sodium Benzoate." Int'l. J. of Toxicology, 20 (Suppl. 3) pp. 23-50 (2001) 28 pgs. Retrieved on May 9, 2024 from https://cir-reports.cir-safety.org/view-attachment?id=9a5e3329-8e74-ec11-8943-0022482f06a6.
Pilz, F., et al. "A welcome side effect—How Velasan® SC (Sorbitan Caprylate) helps to reduce the concentration of classical perservatives." Clariant Produkte (Deutschland) GmbH, n. 3 (2010) pp. 22-25.
Wang, Duoren, "Organic Food Surfactants." Apr. 30, 2009, Science & Technology Lit Press, p. 139.
Williams, R., "Preservatives used in personal case products" The Australian Society of Cosmetic Chemists [retrieved from the Internet on Nov. 16, 2022] URL: https:J/ascc.com.au/preservatives-used-in-personal-care-products-2/, Publ. Jan. 27, 2018.
World Trade Organization (WHO) and European Commission, "IPCS Inchem—Benzoic Acid" —ICSC—0103 (Oct. 1999)—Case # 65-85-0, EC No. 200-618-2; 2 pgs. Retrieved on May 9, 2024 from https://www.inchem.org/documents/icsc/icsc/eics0103.htm.
U.S.A. Government, Food & Drug Administration. "Code of Federal Regulations Title 21—Sodium Benzoate." Dec. 22, 2023 (last update); 2 pgs. Retrieved on May 9, 2024 from https://www.accessdata.fda.gov/scripts/cdrh/cfdocs/cfcfr/CFRSearch.cfm?fr=184.1733&SearchTerm=sodium%20benzoate.
U.S.A. Government, Food & Drug Administration. "Code of Federal Regulations Title 21—Benzoic Acid." Dec. 22, 2023 (last update); 2 pgs. Retrieved on May 9, 2024 from https://www.accessdata.fda.gov/scripts/cdrh/cfdocs/cfcfr/CFRSearch.cfm?fr=184.1021&SearchTerm=benzoic%20acid.
EPO—European Examination Report mailed May 6, 2024 for corresponding European Application No. 20711735.9, 4 pgs.
KIPO—Korean Examination Report mailed May 11, 2024 for corresponding Korean Application No. 10-2021-7029516, 33 pgs.—Translation in English and Korean.
National Institute of Environmental Sciences. Biocidal Substance—"Guidelines for Preparation of Submissions for Approval of Biocides" (Publication Reg. No. 11-1480523-004445-01), Sep. 2021. NIER-GP2021-042; pp. 68-83, and 201 (total 30 pages). Only Korean language available.
USPTO—Office Action mailed on Sep. 5, 2024 for U.S. Appl. No. 16/796,438; 11 pages.
'Flour', Wikipedia, 2000 [retrieved from the Internet on Aug. 31, 2022 (Aug. 31, 2022) at https://en.wikipedia.org/wiki/Flour] para 1.
'Thickening agent', Wikipedia, Aug. 31, 2022 {Aug. 31, 2022, date retrieved) [retrieved from the Internet on Aug. 31, 2022 (Aug. 31, 2022) at https://en.wikipedia.org/wiki/Thickening_agent] p. 2 para 7-8; p. 3 para 3.

* cited by examiner

STABLE ANHYDROUS CLEANSER CONCENTRATE FORMULATION AND METHOD OF MAKING SAME

CROSS REFERENCE TO RELATED APPLICATIONS

This application is a Continuation of U.S. Non-Provisional application Ser. No. 16/796,433, filed Feb. 20, 2020, now U.S. Pat. No. 11,401,488; which claims priority to U.S. Provisional Application No. 62/808,021, filed Feb. 20, 2019; to U.S. Provisional Application No. 62/836,245, filed Apr. 19, 2019; to U.S. Provisional Application No. 62/929,572, filed Nov. 1, 2019; to U.S. Provisional Application No. 62/836,325, filed Apr. 19, 2019; to U.S. Provisional Application No. 62/929,588, filed Nov. 1, 2019; to U.S. Provisional Application No. 62/836,390, filed Apr. 19, 2019; and to U.S. Provisional Application No. 62/929,598, filed Nov. 1, 2019, the entire contents of each are incorporated herein for reference.

BACKGROUND

The majority of cleaning products on the market are in liquid or gel forms and packaged in a plastic tube, bottle, spray bottle, or pump dispenser. The problem is the packaging. Single use plastic is everywhere and it is wreaking havoc on the environment. Only 9% of all plastic is actually recycled, and packaging generates the largest portion of municipal waste (~30%). Packaged products are inefficient for businesses and the people who buy them.

Removing the water from cleaning formulations removes the need for single use plastic packaging and the waste that comes with it, such as packaging waste, product waste, and the waste of resources used to ship water.

Thus, a need exists for new stable formulations of cleansers meet the needs of consumers, while also reducing the amount of waste generated in their production and shipping.

SUMMARY OF THE INVENTION

The invention relates to stable, anhydrous cleanser concentrate formulations. The stable anhydrous cleanser concentrate formulations may be in a solid form such as a tablet, granulars, powder, sachet, or polymer membrane (PVA, PVP, HPMC, etc) form. The solid stable anhydrous cleanser concentrate formulations comprise an acidic cleaner, a pH control agent which can be a basic cleaner, and an oily soil remover (a surfactant). The solid stable anhydrous cleanser concentrate formulation may further comprise a solvent such as a binder or a chelating agent. The solid stable anhydrous cleanser concentrate formulation may further comprise at least one natural and/or synthetic fragrance. The solid stable anhydrous cleanser concentrate formulation may further comprise a dye or coloring agent. The solid stable anhydrous cleanser concentrate formulation may comprise at least one of a fragrance and a coloring agent.

In one aspect, the solid stable anhydrous cleanser concentrate formulation comprises an acidic cleaner, a pH control agent (e.g., a basic cleaner), a chelating agent, a solvent (e.g., a binder), and a preservative and optionally a preservative booster. The solid stable anhydrous cleanser concentrate formulation may have a pH of about 5.0 to about 6.0, about 3.5 to about 4.5, about 4.0 to about 5.0, about 4.5 to about 5.5, or about 9.5 to about 10.5 when dissolved in appropriate amount of water. The solid stable anhydrous cleanser concentrate formulation can comprise citric acid, sodium carbonate, sodium lauryl sulfate, methylglycinediacetic acid, polyethylene glycol, a preservative, and 2,2-dimethyl-1,3-dioxylane-4-methanol. The solid stable anhydrous cleanser concentrate formulation may comprise a coloring agent.

The stable anhydrous cleanser concentrate formulations may comprise one or more binding agents ranging from about 1% to about 20%, by weight.

The stable anhydrous cleanser concentrate formulations may comprise one or more acidic cleaner ranging from about 1.0% to about 85% by weight, based on the weight of the tablet.

In one aspect, the solid stable anhydrous cleanser concentrate formulation may comprise an acidic cleaner in an amount ranging from about 1% to about 85% by weight of the formulation, a pH control agent (e.g., a basic cleaner) in an amount sufficient to adjust the pH to a value from about 2.5 to about 12.5 such as from about 4.0 to about 6.0 when dissolved in water, a solvent (e.g., a binder), an oily soil remover (e.g., a surfactant), and an optional chelating agent. The solid stable anhydrous cleanser concentrate formulation may further comprise a buffer in an amount sufficient to adjust the pH to a desired value such as from about 2.5 to about 12.5 further such as from about 4.0 to about 6.0.

The acidic cleaner and basic together are referred as effervescent ingredients. In one aspect, the solid stable anhydrous cleanser concentrate formulation can comprise the effervescent ingredients in an amount ranging from about 30% to about 80 or from about 30% to about 55% by weight, preservatives in an amount ranging from about 10% to about 40% or from about 20% to about 40% by weight, and at least one ingredient selected from surfactant, binder, and lubricant in an amount ranging from about 2% to about 25% or from about 10% to about 25% by weight, based on the weight of the formulation. The effervescent ingredients (e.g. the acidic and basic cleaner) can facilitate homogeneous distribution and dissolution of the surfactant into water before use.

In one aspect, a method of making a concentrated cleanser tablet for use in cleaning is provided.

The solid stable anhydrous cleanser concentrate formulation can be used to clean bathroom, glass, multi-surface, and any other areas including but not limited to daily shower room, toilet bowl, floor, and etc.

DETAILED DESCRIPTION OF THE INVENTION

This disclosure relates to solid stable anhydrous cleanser concentrate formulations. The inventors have discovered a solid formulation that is both good for the environment and effective for cleaning purpose. The advantages of this solid formulation over the traditional liquid cleansers include chemical stability, reduced packaging, and convenience for the consumer.

Specifically, the solid stable anhydrous cleanser concentrate formulations of this disclosure may include an acidic cleaner, a pH control agent (e.g., a basic cleaner), an oily soil remover (e.g., a surfactant), and an optional ingredient selected from a solvent (e.g., a binder), a preservative, and chelating agent. The formulation may optionally include one or more fragrances, dyes, or coloring agents.

As used in this specification, the singular forms "a," "an," and "the" include plural referents unless the context clearly dictates otherwise. Thus, for example, reference to a "preservative booster" includes a single kind of preservative booster or two or more different kinds of preservative booster.

"About" as used herein means within an acceptable error range for the particular value as determined by one of ordinary skill in the art, which will depend in part on how the value is measured or determined, (i.e., the limitations of the measurement system). For example, "about" can mean within 1 or more than 1 standard deviations, per practice in the art. Where particular values are described in the application and claims, unless otherwise stated, the term "about" means within an acceptable error range for the particular value. The term "about" when qualifying a value of a stated item, number, percentage, or term refers to a range of plus or minus ten percent of the value of the stated item, percentage, parameter, or term.

The term 'solvent" as used in the cleaner concentrate formulations refers to a binder which can be solid.

The term "oily soil remover" is used interchangeably with "surfactant."

The term "anhydrous" as used herein refers to a stable, anhydrous cleanser concentrate formulation comprising less than about 5%, 4%, 3%, 2% or 1% by weight of water based on the weight of the concentrate.

The term "substantially fatty acid-free" as used herein refers to a solid stable, anhydrous cleanser concentrate formulation comprising less than 10%, 9%, 8%, 7%, 6%, 5%, 4%, 3%, 2%, or 1% by weight of a fatty acid (or salt thereof) based on the weight of the concentrate, or comprising a fatty acid (or salt thereof) in an amount less than the amount used in a hand soap bar.

The term "substantially animal fat free" as used herein refers to a solid stable, anhydrous cleanser concentrate formulation comprising less than 10%, 9%, 8%, 7%, 6%, 5%, 4%, 3%, 2%, or 1% by weight of an animal fat (such as tallow) (or salt thereof) based on the weight of the concentrate, or comprising or comprising a an animal fat (or salt thereof) in an amount less than the amount used in a hand soap bar.

Some of the ingredients may have multiple functions. However, when two or more ingredients defined based on their functions are included in a formulation disclosed herein, the ingredients differ from each other in terms of their chemical structure. For example citric acid can be a water softening agent and a acidic cleaner as well, but when both water softening agent and acidic cleaner are used in the description of the formulation, they intend to refer to different ingredients in terms of the chemical structure.

The term "comprising" includes the embodiments of "consisting of" or "consisting essentially of."

The amount of acidic cleaner in the solid stable, anhydrous cleanser concentrate formulation may range from about 1% to about 85% by weight, based on the weight of the formulation. The amount of acidic cleaner per tablet may be about 1%, about 5%, about 10%, about 15%, about 20%, about 25%, about 30%, about 40%, about 50%, about 60%, about 70%, about 75%, about 80%, about 85%, about 5% to about 85%, about 10% to about 75%, about 10% to about 50%, about 15% to about 70%, about 20% to about 65%, about 25% to about 60%, about 30% to about 55%, about 35% to about 50%, or about 40% to about 45% by weight of the formulation. The acidic cleaner may be citric acid and/or malic acid.

The solid stable, anhydrous cleanser concentrate formulation may contain a pH control agent in an amount sufficient to adjust the pH when dissolved in water from about 2.0 to about 12.5, from about 5.0 to about 6.0, from about 3.5 to about 4.5, from about 4.0 to about 5.0, from about 4.5 to about 5.5, or from about 9.5 to about 10.5. The pH of the dissolved tablet in water may be about 2.0, about 2.5, about 3.0, about 3.5, about 4.0, about 4.5, about 5.0, about 5.5, about 2.0 to about 5.5, about 7.5, about 8.0, about 8.5, about 9.0, about 10.0, about 10.5, about 11.0, about 11.5, about 12.0, about 12.5, or about 7.5 to about 12.5. The pH control agent may be any agent sufficient to raise or lower the pH of the tablet when dissolved in water, which include a basic cleaner and an acidic cleaner, such as sodium carbonate, sodium bicarbonate, citric acid, or malic acid. When both an acidic cleaner and a pH control agent are contained in the solid formulation, the acidic cleaner differs from the pH control agent.

When the pH control agent is a basic cleaner, the amount of the basic cleaner may range from about 5% to about 60%, from about 5% to about 30%, from about 10% to about 30%, from about 10% to about 25%, from about 5% to about 10%, from about 40% to about 60%, or from about 35% to about 45%, by weight, based on the weight of the formulation. The basic cleaner may be sodium carbonate, sodium bicarbonate and/or any other alkali carbonates.

The amount of chelating agent in the tablet may range from about 0.01% to about 95% by weight, based on the weight of the tablet. The amount of chelating agent may be about 1%, about 1.5%, about 2.0%, about 2.5%, about 3.0%, about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, about 10.0%, about 2% to about 10.0%, about 3% to about 7%, or about 1% to about 10% by weight. The cleaning tablet may contain one or more chelating agents, such as MGDA (methylglycineadiacetic acid and salts), tri-sodium citrate, GLDA (L-glutamic acid, N, N-diacetic acid sodium salts), EDDS (ethylenediaminedisuccinic acid and salts), and IDS (iminodisuccinic acid and salts).

The amount of solvent (a binder) in the solid stable, anhydrous cleanser concentrate formulation may range from about 0 to about 50% such as about 1% to about 20%, less than about 5%, from about 0 to about 5%, from about 3 to about 7%, from about 4% to about 8%, by weight, based on the weight of the formulation. The amount of solvent may be about 1%, about 1.5%, about 2.0%, about 2.5%, about 3.0%, about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, about 10.0%, about 2% to about 10.0%, about 3% to about 7%, about 1% to about 10%, or about 4% to about 8% by weight. The amount of binding agent in the solid stable, anhydrous cleanser concentrate formulation may range from about 1% to about 20% by weight, based on the weight of the formulation. The amount of binding agent is suitable to form a tablet and may be about 1%, about 2%, about 3%, about 4%, about 5%, about 6%, about 7%, about 8%, about 9%, about 10%, about 12%, about 15%, about 18%, about 20%, about 3% to about 7%, about 4% to about 8%, about 5% to about 10%, or about 10% to about 20%. The solid stable, anhydrous cleanser concentrate formulation may contain one or more solvents selected from the group consisting of polyethylene glycol (e.g., polyethylene glycol 8000), sorbitol, and dextrose.

The amount of oily soil remover (a surfactant) in the solid stable, anhydrous cleanser concentrate formulation may range from 0.01% to about 40% such as from about 1% to about 20%, from about 2% to about 15%, from about 8% to about 12%, from about 1% to about 15%, from about 3% to about 7%, from about 6% to about 20%, from about 16% to about 20%, or from about 10% to 14% by weight, based on the weight of the formulation. The amount of oily soil remover may be about 1%, about 2%, about 3%, about 4%, about 5%, about 6%, about 7%, about 8%, about 9%, about 10%, about 12%, about 15%, about 18%, about 20%, about 16% to about 20%, about 3% to about 7%, about 4% to about 8%, about 8% to about 12%, about 5% to about 10%, about 10% to about 15%, or about 10% to about 20%. The oily soil remover (i.e. surfactant) can be natural or synthetic surfactants, such an anionic, nonionic, amphoteric, zwitterioinic, or cationic surfactants, such as anionic and non-ionic surfactants, further such as a surfactant selected from sodium coco sulfate, ethoxylated alcohols (such as ethoxylated alcohol C(10-12)-C(14-16) with 4-8 moles ethoxylation, for example Clariant Genapol LA 060 (ethoxylated alcohol C12-C16) w/6 moles ethoxylation, ethoxylated alcohols C8-C10 6-8 moles of EO, etc.), sodium lauryl sulfate, and alkyl polyglucosides (such as lauryl glucoside, caprylyl/myristyl glucoside, caprylyl/decyl Glucoside).

The amount of the preservative in the solid stable, anhydrous cleanser concentrate formulation may range from about 5% to about 40%, from 5% to about 30%, from about 10% to about 30%, from about 10% to about 25%, or from about 10% to about 20%, by weight, based on the weight of the formulation. The amount of the preservative may be about 5%, about 7%, about 9%, about 11%, about 13%, about 15%, about 17%, about 19%, about 21%, about 23%, about 25%, about 27%, about 29%, about 31%, about 33%, about 35%, about 37%, about 39%, or about 40%. The preservative may be sodium benzoate, potassium sorbate, gluconolactone, and/or biocideal preservatives.

The amount of the preservative booster in the solid stable, anhydrous cleanser concentrate formulation may range from about 0.1% to about 15%, from about 0.5% to about 10%, from about 1% to about 10%, or from about 1% to about 5%, by weight, based on the weight of the formulation. The amount of the preservative booster may be about 0.1%, about 0.2%, about 0.3%, about 0.4%, about 0.5%, about 1%, about 2%, about 3%, about 4%, about 5%, about 6%, about 7%, about 8%, about 9%, or about 10%. The preservative booster may be a sorbate such as potassium sorbate.

The amount of the lubricating agent in the solid stable, anhydrous cleanser concentrate formulation may range from about 0.1 to about 3.0% by weight based on the weight of the formulation. Exemplary lubricating agent can be selected from magnesium stearate, leucine, sodium lauryl sulfate, sodium benzoate etc.

The amount of chelating agent may be about 1%, about 1.5%, about 2.0%, about 2.5%, about 3.0%, about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, about 10.0%, about 2% to about 10.0%, about 3% to about 7%, or about 1% to about 10% by weight. The solid stable, anhydrous cleanser concentrate formulation may contain one or more chelating agents, such as MGDA (methylglycineadiacetic acid and salts), tri-sodium citrate, GLDA (L-glutamic acid, N, N-diacetic acid sodium salts), EDDS (ethylenediaminedisuccinic acid and salts), and IDS (iminodisuccinic acid and salts).

The solid stable, anhydrous cleanser concentrate formulation may contain biologic cleaners, such as enzymes (e.g., protease, amylase, lipase, cellulose, pectinase, mannanase, and the like) and probiotics (e.g., *lactobacillus*, bifidobacterial, and the like). Biological cleaners may be present in an amount of about 0.01% to about 50% by weight, based on the weight of the tablet.

The solid stable, anhydrous cleanser concentrate formulation may contain one or more fragrances, such as natural fragrances (e.g., essential oils) and/or synthetic fragrances and perfumes in the form of oils, crystals, powders, granules, and encapsulations.

The solid stable, anhydrous cleanser concentrate formulation may contain one or more dyes or coloring agents, such as Food, Drug and Cosmetic (FD&C) approved dyes and colorants.

In some embodiments, the solid stable, anhydrous cleanser concentrate formulation may include silica as a flow aid for the formation of free-flowing powder. Free-flowing powder is subsequently converted into tablets.

In some embodiments, the solid stable, anhydrous cleanser concentrate formulation does not include silica. The precursor such as free-flowing powder can be formed by using solids, such as sodium carbonate and sodium benzoate, as the initial ingredients to absorb any potential liquids that can be used in the cleaner concentrate formulation.

The solid stable, anhydrous cleanser concentrate formulation may include an acidic cleaner, a pH control agent, a solvent, a preservative, and an optional chelating agent. The solid stable, anhydrous cleanser concentrate formulation may have a pH of about 2.5 to about 12.5, about 2.0 to about 5.5, about 5.0 to about 6.0, about 3.5 to about 4.5, about 4.0 to about 6.5, about 4.0 to about 5.0, about 4.5 to about 5.5, about 7.5 to about 11, about 7.5 to about 12.5, or about 9.5 to about 10.5, when dissolved in water.

In one embodiment, the solid stable, anhydrous cleanser concentrate formulation includes citric acid, sodium carbonate, sodium lauryl sulfate, methylglycincadiacetic acid, polyethylene glycol, a preservative, and 2,2-dimethyl-1,3-dioxylane-4-methanol. In some embodiments, the solid stable, anhydrous cleanser concentrate formulation includes citric acid, sodium carbonate, sodium bicarbonate, sodium metasilicate, one or more ethoxylated alcohols, methylglycinediacetic acid, polyethylene glycol, silicon dioxide, and magnesium stearate. In some embodiments, the solid stable, anhydrous cleanser concentrate formulation includes citric acid, sodium carbonate, one or more ethoxylated alcohols, methylglycineadiacetic acid, polyethylene glycol, a preservative, silicon dioxide, and magnesium stearate. The solid stable, anhydrous cleanser concentrate formulation may also include a coloring agent.

When the solid stable, anhydrous cleanser concentrate formulation is in eh form of a tablet. The tablet can be in any size. For example, it may weigh from about 2.0 to about 9.0 g, such as from about 4.5 g to about 5.5 g, such as from about 6.5 g to about 7.1 g, from about 6.0 and about 7.5 grams, from about 7.9 g to about 8.5 g, about 2.5 g, about 3 g, about 4 g, about 5 g, about 6 g, about 7 g, or about 8 g.

The tablet can be dissolved into appropriate amount of water before use. For example, the ratio of tablet to water can be about 5 g, 6.8 g, or 8.2 g of tablet in 20-34 oz of water.

In each of the preceding embodiments, the solid stable, anhydrous cleanser concentrate formulation can be substantially fatty acid free and/or substantially animal fat free.

The solid stable anhydrous cleanser concentrate formulations may be formatted as tablets, powders, or granules. The stable anhydrous cleanser concentrate formulations may also be formatted in single-use sheets.

Methods for Preparing Stable Anhydrous Cleanser Tablets

The stable anhydrous cleanser tablets can be prepared using any suitable method. Stable anhydrous cleanser tablet can be prepared using direct compression or wet granulation process. For this application direct compression is most preferred. The term direct compression (or direct compaction) is used to define the process by which tablets are compressed directly from powdered substance and suitable excipients into a firm compact without employing the process of granulation. Powder is blended homogeneously using a blender (Ribbon Blender, V-blender, paddle blender, drum mixing). The powder blender is then charged into the hopper of tablet press. Desire weight, compression ton, and hardness of tablet are set as the tablets get compressed and come out of the tablet press.

To avoid effervescence from happening during storage, the cleanser formulation can be pressed to achieve a sufficient hardness and/or the formulation contains a desiccating agent such as hydrated silica or any other agent known to absorb moisture.

Format

The stable anhydrous cleanser concentrate formulations in powder form can also be diluted in water in a powder to water ratio of greater than or equal to 1:1 (w/w) to form a paste before shipment. A method of using the paste comprises placing the paste on surface to be cleaned either directly or through a rag or sponge, leaving overnight soak, and rinsing the surface water.

The solid stable anhydrous cleanser concentrate formulations described herein may be designed to be rinsed off, wiped, off, or left off for maximum cleaning efficiency.

When the solid stable anhydrous cleanser concentrate formulation is in the form of a tablet, the tablets may range in size from about 200 mg to about 9000 mg or from about 200 mg to 5000 mg. The tablets may be about 200 mg, about 300 mg, about 400 mg, about 500 mg, about 600 mg, about 700 mg, about 800 mg, about 900 mg, or about 1000 mg. In a preferred embodiment, the tablets are round, however other geometric shapes are contemplated.

Methods of Using Stable Anhydrous Cleanser Tablets

In one aspect, disclosed is a method of using any of the tablets described herein including the steps of (1) filling a spray bottle or vessel with volume of 16-34 oz with water, (2) adding the cleaning tablet to the water-filled spray bottle, and (3) dissolving the tablet in water by no stirring or shaking required. In some embodiments, one or more cleaning tablets may be added to the water-filled spray bottle. For example, two cleaning tablets may be added to the spray bottle simultaneously or in a row before ultimately using the liquid solution for cleaning purpose.

Each individual cleanser tablet, when exposed to water and stirred or shaken, will dissolve into a liquid cleansing solution. Upon experiencing dissolution of the cleanser tablet, the user may proceed with cleaning or washing as usual. Individual tablets may be packaged together in suitable bulk quantities.

The cleanser tablets may be stored in any suitable container, such as but not limited to plastic, glass, aluminum, ceramic, or acrylic container. The container may contain a desiccant. The container may be re-usable and refilled with new tablets as needed.

One set of non-limiting exemplary embodiments is disclosed below:

1. A stable anhydrous cleanser concentrate formulation in a solid form, comprising an acidic cleaner, a basic cleaner, and a surfactant.
2. The stable anhydrous cleanser concentrate formulation of embodiment 1, which is substantially fatty acid free and/or substantially animal fat free.
3. The stable anhydrous cleanser concentrate formulation of embodiment 1 or 2, wherein at least one of the acidic cleaner and the basic cleaner is present in an amount greater than that of the surfactant.
4. The stable anhydrous cleanser concentrate formulation of embodiment 1 or 2, wherein the acidic cleaner and the basic cleaner together are present in an amount greater than that of the surfactant.
5. The stable anhydrous cleanser concentrate formulation of any of embodiments 1-4, wherein the acidic cleaner is present in an amount from about 1% to about 85%, about 5% to about 85%, about 10% to about 75%, about 10% to about 50%, about 15% to about 70%, about 20% to about 65%, about 25% to about 60%, about 30% to about 55%, about 35% to about 50%, or about 40% to about 45% by weight, based on the weight of the formulation.
6. The stable anhydrous cleanser concentrate formulation of embodiment 5, wherein the acidic cleaner is present in an amount from about 10% to about 50% by weight, based on the weight of the formulation.
7. The stable anhydrous cleanser concentrate formulation of any of embodiments 1-6, wherein the acidic cleaner is selected from citric acid and malic acid.
8. The stable anhydrous cleanser concentrate formulation of any of embodiments 1-7, wherein the basic cleaner is present in an amount from about 5% to about 60%, from about 5% to about 30%, from about 10% to about 30%, from about 10% to about 25%, from about 5% to about 10%, from about 40% to about 60%, or from about 35% to about 45%, by weight, based on the weight of the formulation.
9. The stable anhydrous cleanser concentrate formulation of embodiment 8, wherein the basic cleaner is present in an amount from about 5% to about 60%.
10. The stable anhydrous cleanser concentrate formulation of any of embodiments 1-9, wherein the basic cleaner is selected from sodium carbonate, sodium bicarbonate and any other alkali carbonates.
11. The stable anhydrous cleanser concentrate formulation of any of embodiments 1-10, wherein the surfactant is present from about 0.01% to about 40%, from about 1% to about 20%, from about 2% to about 15%, from about 8% to about 12%, from about 1% to about 15%, from about 3% to about 7%, from about 6% to about 20%, from about 16% to about 20%, or from about 10% to 14% by weight, based on the weight of the formulation.
12. The stable anhydrous cleanser concentrate formulation of embodiment 11, wherein the surfactant is present from about 1% to about 20% by weight, based on the weight of the formulation.
13. The stable anhydrous cleanser concentrate formulation of any of embodiments 1-12, wherein the surfactant comprises an anionic and/or nonionic surfactant.
14. The stable anhydrous cleanser concentrate formulation of embodiment 13, wherein the anionic surfactant is selected from sodium coco sulfate and sodium lauryl sulfate.
15. The stable anhydrous cleanser concentrate formulation of embodiment 13 or 14, wherein the nonionic surfactant is selected from ethoxylated alcohol and alkyl polyglucosides.
16. The stable anhydrous cleanser concentrate formulation of any of embodiments 1-15, further comprising a binding agent.
17. The stable anhydrous cleanser concentrate formulation of any of embodiments 1-16, wherein the binding agent is present in an amount ranging from about 0 to about 50%, from about 1% to about 20%, less than about 5%, from about 0 to about 5%, from about 3 to about 7%, from about 4% to about 8%, by weight, based on the weight of the formulation.

18. The stable anhydrous cleanser concentrate formulation of embodiment 16 or 17, wherein the binding agent is selected from polyethylene glycol, sorbitol, and dextrose.
19. The stable anhydrous cleanser concentrate formulation of any of embodiments 1-18, further comprising a preservative and/or preservative booster.
20. The stable anhydrous concentrate formulation of embodiment 19, wherein the preservative is present in an amount ranging about 5% to about 40%, from 5% to about 30%, from about 10% to about 30%, from about 10% to about 25%, or from about 10% to about 20%, by weight, based on the weight of the formulation.
21. The stable anhydrous concentrate formulation of embodiment 19 or 20, wherein the preservative is selected from sodium benzoate, gluconolactone, and biocidal preservatives.
22. The stable anhydrous concentrate formulation of any of embodiments 19-21, wherein the preservative booster is present in an amount ranging from about 0.1% to about 15% by weight, based on the weight of the formulation.
23. The stable anhydrous concentrate formulation of any of embodiments 19-22, wherein the preservative booster is selected from sorbate.
24. The stable anhydrous concentrate formulation of any of embodiments 1-23, comprising citric acid, sodium carbonate, sodium coco sulfate or sodium lauryl sulfate, sodium benzoate, and optionally one ingredient selected from polyethylene glycol, sodium bicarbonate and a sorbate.
25. The stable anhydrous concentrate formulation of any of embodiments 1-24, further comprising an ingredient selected from process aid (flow aid), fragrance, chelating agent, lubricating agent, and a coloring agent.
26. The stable anhydrous concentrate formulation of any of embodiments 1-25, which is in the form of a tablet.
27. The stable anhydrous concentrate formulation of embodiment 26, which is in the form of a tablet wherein the tablet is not tacky.
28. The stable anhydrous concentrate formulation of any of embodiments 1-25, which is in the form of powder.
29. A method of preparing a tablet, comprising blending homogeneously the ingredients of any of embodiments 1-25 to form a mixture and compressing the mixture to form the tablet.
30. A method of using the tablet of embodiment 27 comprising (1) filling a spray bottle or vessel with water, (2) adding the tablet to the water-filled spray bottle or vessel, and (3) dissolving the tablet in appropriate amount of water.
31. The method of embodiments 30, further comprising applying the solution to a surface to be cleaned.
32. A method of using the powder of embodiment 28 comprising diluting the powder in water at a powder to water ratio of greater than or equal to 1:1 (w/w) to form a paste, placing the paste on a surface to be cleaned either directly or through a rag or sponge, leaving overnight soak, and rinsing the surface water.
33. The method of embodiment 31 or 32, wherein the surface to be cleaned is the surface of bathroom, multi-surface, or glass.

Another set of non-limiting exemplary embodiments is disclosed below:

1. A stable anhydrous concentrate formulation in a solid form comprising effervescent ingredients in an amount ranging from about 30% to about 80 or from about 30% to about 55% by weight, preservatives in an amount ranging from about 10% to about 40% or from about 20% to about 40% by weight, and at least one ingredient selected from surfactant, binder, and lubricant in an amount ranging from about 2% to about 25% or from about 10% to about 25% by weight, based on the weight of the formulation.
2. The stable anhydrous concentrate formulation of embodiment 1, wherein the effervescent ingredients comprise an acidic cleaner and a basic cleaner.
3. The stable anhydrous concentrate formulation of embodiment 2, wherein the acidic cleaner is selected from citric acid and malic acid.
4. The stable anhydrous concentrate formulation of embodiment 2 or 3, wherein the basic cleaner is selected from sodium carbonate, sodium bicarbonate and other alkali carbonates.
5. The stable anhydrous concentrate formulation of any of embodiments 1-4, wherein the preservative is selected from odium benzoate, gluconolactone, and biocidal preservatives.
6. The stable anhydrous concentrate formulation of any of embodiments 1-5 wherein the surfactant comprises an anionic and/or nonionic surfactant.
7. The stable anhydrous cleanser concentrate formulation of embodiment 6, wherein the anionic surfactant is selected from sodium coco sulfate and sodium lauryl sulfate.
8. The stable anhydrous cleanser concentrate formulation of embodiment 6 or 7, wherein the nonionic surfactant is selected from ethoxylated alcohol and alkyl polyglucosides.
9. The stable anhydrous cleanser concentrate formulation of any of embodiments 1-8, wherein the binding agent is selected from polyethylene glycol, sorbitol, and dextrose.
10. The stable anhydrous cleanser concentrate formulation of any of embodiments 1-9, wherein the lubricating agent is selected from magnesium stearate, leucine, sodium lauryl sulfate, and sodium benzoate.
11. The stable anhydrous cleanser concentrate formulation of any of embodiments 1-10, further comprising an ingredient selected from process aid (flow aid), fragrance, chelating agent, and a coloring agent.
12. The stable anhydrous concentrate formulation of any of embodiments 1-11, which is in the form of a tablet.
13. The stable anhydrous concentrate formulation of embodiment 12, which is in the form of a tablet wherein the tablet is not tacky.
14. The stable anhydrous concentrate formulation of any of embodiments 1-13, which is in the form of powder.
15. A method of preparing a tablet, comprising blending homogeneously the ingredients of any of embodiments 1-13 to form a mixture and compressing the mixture to form the tablet.
16. A method of using the tablet of embodiment 13 comprising (1) filling a spray bottle or vessel with water, (2) adding the tablet to the water-filled spray bottle or vessel, and (3) dissolving the tablet in appropriate amount of water.
17. The method of embodiment 30, further comprising applying the solution to a surface to be cleaned.
18. A method of using the powder of embodiment 14 comprising diluting the powder in water at a powder to water ratio of greater than or equal to 1:1 (w/w) to form a paste, placing the paste on a surface to be cleaned either directly or through a rag or sponge, leaving overnight soak, and rinsing the surface water.

19. The method of embodiment 17 or 18, wherein the surface to be cleaned is the surface of bathroom, multi-surface, or glass.

Yet another set of non-limiting exemplary embodiments is disclosed below:

1. A stable glass cleanser concentrate tablet or powder, comprising an acidic cleaner, a pH control agent, a solvent, an oily soil remover, and an optional chelating agent.
2. The tablet or powder of embodiment 1, further comprising at least one natural and/or synthetic fragrance.
3. The tablet or powder of embodiment 1 or 2, further comprising a dye or coloring agent.
4. A glass cleanser concentrate tablet or powder, comprising an acidic cleaner, a pH control agent, a solvent, a preservative, and an optional chelating agent.
5. The glass cleanser concentrate tablet or powder of embodiment 4, wherein said tablet or powder produces a solution having a pH of about 5.0 to about 6.0 when dissolved in water.
6. The glass cleanser concentrate tablet or powder of any one of the previous embodiments, wherein said tablet comprises citric acid, sodium carbonate, sodium lauryl sulfate, methylglycinediacetic acid, polyethylene glycol, a preservative, and 2,2-dimethyl-1,3-dioxylane-4-methanol.
7. The glass cleanser concentrate tablet or powder of any one of the previous embodiments, further comprising a coloring agent.
8. The tablet or powder of any one of the previous embodiments, wherein the amount of acidic cleaner ranges from about 1.0% to about 85% by weight, based on the weight of the tablet or powder.
9. A glass cleanser concentrate tablet or powder for use in cleaning, comprising: an acidic cleaner in an amount ranging from about 1% to about 85% by weight a pH control agent in an amount sufficient to adjust the pH to about 4.0 to about 6.0 when dissolved in water, a solvent, an oily soil remover, and an optional chelating agent.
10. The tablet or powder of any one of the previous embodiments, comprising no silica.
11. The glass cleanser concentrate tablet or powder of any one of embodiments 1-10, wherein said tablet weighs about five grams.
12. A method of making a concentrated cleanser tablet or powder for use in cleaning.
13. A method of using the tablet or powder of any one of embodiments 1-11 comprising (I) filling a spray bottle or vessel with water, (2) adding a cleaning tablet or powder to the water-filled spray bottle or vessel, and (3) dissolving the tablet in water.
14. A method of using the powder of any one of embodiments 1-11 comprising diluting the powder in water at a powder to water ratio of greater than or equal to 1:1 (w/w) to form a paste, placing the paste on surface to be cleaned either directly or through a rag or sponge, leaving overnight soak, and rinsing the surface water.

Yet Another set of non-limiting exemplary embodiments is disclosed below

1. A bathroom cleanser concentrate tablet or powder, comprising an acidic cleaner, a pH control agent, a solvent, an oily soil remover, and an optional chelating agent.
2. The bathroom cleanser tablet or powder of embodiment 1, wherein said tablet produces a low pH solution in the range of about 2.0 to about 5.5 when dissolved in water.
3. The bathroom cleanser tablet or powder of embodiment 1, wherein said tablet produces a high pH solution in the range of about 7.5 to about 12.5 when dissolved in water.
4. The bathroom cleanser tablet or powder of any one of the previous embodiments, wherein said tablet or powder comprises citric acid, sodium carbonate, sodium bicarbonate, sodium metasilicate, one or more ethoxylated alcohols, methylglycinediacetic acid, polyethylene glycol, silicon dioxide, and magnesium stearate.
5. The bathroom cleanser tablet or powder of any one of the previous embodiments, further comprising at least one of a fragrance and a coloring agent.
6. The tablet or powder of any one of the previous embodiments, wherein the binding agent ranges from about 1% to about 20% by weight.
7. The tablet or powder of any one of the previous embodiments, wherein the amount of acidic cleaner ranges from about 1.0% to about 85% by weight, based on the weight of the tablet or powder.
8. A cleanser concentrate tablet or powder for use in cleaning, comprising:

an acidic cleaner in an amount ranging from about 1% to about 85% by weight, a pH control agent in an amount sufficient to adjust the pH to about 2.5 to about 12.5 when dissolved in water, a solvent, an oily soil remover, and an optional chelating agent.

9. The tablet or powder of embodiment 8, further comprising a buffer in an amount sufficient to adjust the pH when dissolved in water from about 2.0 to about 12.5.
10. The tablet or powder of any of the preceding embodiments, comprising no silica.
11. A method of making a concentrated bathroom cleanser tablet or powder for use in cleaning.
12. A method of using the bathroom cleanser tablet or powder of any one of embodiments 1-10 comprising (1) filling a spray bottle or vessel with water, (2) adding one or more cleaning tablets to the water filled spray bottle or vessel, and (3) dissolving the tablet in water.

13. A method of using the powder of any one of embodiments 1-10 comprising diluting the powder in water at a powder to water ratio of greater than or equal to 1:1 (w/w) to form a paste, placing the paste on surface to be cleaned either directly or through a rag or sponge, leaving overnight soak, and rinsing the surface water.

Yet another set of non-limiting embodiments is disclosed below:

1. A stable multi-surface cleanser concentrate tablet or powder, comprising an acidic cleaner, a pH control agent, a solvent, an oily soil remover, and an optional chelating agent.
2. The tablet or powder of embodiment 1, further comprising at least one natural and/or synthetic fragrance.
3. The tablet or powder of embodiment 1 or 2, further comprising a dye or coloring agent.
4. A multi-surface cleanser concentrate tablet or powder, comprising an acidic cleaner, a pH control agent, a binding agent, a solvent, a preservative, an oily soil remover, and an optional chelating agent.

5. The multi-surface cleanser tablet or powder of embodiment 4, wherein said tablet produces a low pH solution in the range of about 4.0 to about 6.5 when dissolved in water.
6. The multi-surface cleanser tablet or powder of embodiment 4, wherein said tablet produces a high pH solution in the range of about 7.5 to about 11.0 when dissolved in water.
7. The multi-surface cleanser tablet of any one of the previous embodiments, wherein said tablet or powder comprises citric acid, sodium carbonate, one or more ethoxylated alcohols, methylglycinediacetic acid. polyethylene glycol. a preservative, silicon dioxide, and magnesium stearate.
8. The multi-surface cleanser tablet or powder of any one of embodiments 9-13, further comprising at least one of a fragrance and a coloring agent.
9. The tablet or powder of any one of the previous embodiments, wherein the binding agent ranges from about 1% to about 20% by weight.
10. The tablet or powder of any one of the previous embodiments, wherein the amount of acidic cleaner ranges from about 1.0% to about 85% by weight, based on the weight of the tablet or powder.
11. A cleanser concentrate tablet or powder for use in cleaning, comprising:

an acidic cleaner in an amount ranging from about 1% to about 85% by weight, a pH control agent in an amount sufficient to adjust the pH to about 2.5 to about 12.5 when dissolved in water, a solvent, an oily soil remover, and an optional chelating agent.

12. The tablet or powder of embodiment 11, further comprising a buffer in an amount sufficient to adjust the pH when dissolved in water from about 2.0 to about 12.5.
13. The tablet or powder of any one of the previous embodiments, comprising no silica.
14. A method of making a concentrated multi-surface cleanser tablet or powder for use in cleaning.
15. A method of using the tablet or powder of any one of the previous embodiments comprising (1) filling a spray bottle or vessel with water, (2) adding a cleaning tablet or powder to the water-filled spray bottle or vessel, and (3) dissolving the tablet in water.
16. A method of using the powder of any one of embodiments 1-13 comprising diluting the powder in water at a powder to water ratio of greater than or equal to 1:1 (w/w) to form a paste, placing the paste on surface to be cleaned either directly or through a rag or sponge, leaving overnight soak, and rinsing the surface water.

EXEMPLIFICATION

Materials used in the following Examples and their sources are listed below.

Example 1

A glass cleaner tablet was produced, using the following ingredients:

TABLE 1

| Raw Materials | Chemistry | Function in tablet | Function in final dilution | Weight (%) |
|---|---|---|---|---|
| Citric Acid | Citric Acid | Acid for effervescent | Acidic Cleaner | 20-25 |
| Sodium Carbonate | Sodium Carbonate Dense | Base for effervescent | Cleaner/pH control | 20-25 |
| Sodium Lauryl Sulfate | Sodium Lauryl Sulfate | Anionic Surfactant | cleaner | 8-12 |
| Trilon-MSG | methylglycinediacetic acid | Chelating agent | Chelating agent | 3-7 |
| PEG 8000 | Polyethylene Glycol 8000 | Binder | solvent | 3-7 |
| Neo Defend | Gluconolactone & Sodium Benzoate (GSB) | Preservative | preservative | 30-35 |
| Augeo Clean Multi | 2,2-dimethyl-1,3-dioxylane-4-methanol | settle the dust from SLS | solvent | 0.5-2.0 |
| Dye/colorant | FD&C or polymetric dye | visual effect | visual effect | 0.001-0.01 |
| Total | | | | 100.00 |
| pH | | | | pH 5.0-6.0 |
| Liquid Load (%) | | | | 1.00 |

Example 2

Glass Cleaner: Tablet weight(g)—5.0 g

TABLE 2

| Ingredients | % | Weight (grams) |
|---|---|---|
| Effervescent Ingredients | 45-55% | 2.25-2.75 g |
| Preservatives | 30-40% | 1.50-2.00 g |
| Surfactant, Binder, Lubricant, etc | 10-20% | 0.5-1.00 g |

To preserve 20 oz of tap water with the glass cleaning concentrate formulation disclosed herein, 1.50-2.00 grams of preservatives are needed. In order for the tablets to dissolve in reasonable time (~8-10 mins), about 45-55% Effervescent ingredients are needed. After all the other ingredients (Surfactant, Binder, Lubricant, etc) are combined, the lowest weight is landing around 4.5 grams. A 5.0 grams for Glass cleaner tablets are prepared to give little extra Effervescent ingredients to help reduce the dissolution time.

Example 3

A glass cleaner tablet was produced, using the following ingredients:

TABLE 3

| Raw Materials | Chemistry | Function in tablet | Function in final dilution | Weight (%) |
|---|---|---|---|---|
| Citric Acid | Citric Acid | Acid for effervescent | Acidic Cleaner | 25-35 |
| Sodium Benzoate | Sodium Benzoate | Preservative | Preservative | 15-25 |
| Sodium Bicarbonate | Sodium Bicarbonate Dense | Base for effervescent | Cleaner/pH control | 0-14 |
| Potassium Sorbate | Potassium Sorbate | preservative booaster | preservative booaster | 5-15 |
| Sodium Carbonate | Sodium Carbonate | Base for effervescent | Cleaner/pH control | 7-25 |
| Sodium Lauryl Sulfate | Sodium Lauryl Sulfate | Anionic Surfactant | cleaner | 1-15 |
| Gluconolactone | Gluconolactone | Preservative booster | Preservative booster | 0-6 |
| PEG 8000 | Polyethylene Glycol 8000 | Binder | solvent | <5 |
| L-leucine | L-leucine | lubricant | | 0-5 |
| Augeo Clean Multi (Isopropylidene Glycerol) | 2,2-dimethyl-1,3-dioxylane-4-methanol | Process aid | | 0-2 |
| Liquitint Winter Blue Basic | Polymeric dye | colorant | solvent | 0-1 |
| pH | | | | pH 4.5-5.5 |

Example 4

A multi-surface low pH cleanser tablet was produced, using the following ingredients:

TABLE 4

| Raw Materials | Chemistry | Function in tablet | Function in final dilution | Weight (%) |
|---|---|---|---|---|
| Citric Acid | Citric Acid | Acid for effervescent | Acidic Cleaner | 28-32 |
| Sodium Carbonate | Sodium Carbonate Dense | Base for effervescent | Cleaner/pH control | 22-25 |
| BASF Lutensol AT 25 | ethoxylated alcohols | Nonionic Surfactant | oily soil remover | 3-7 |
| Trilon-MSG | methylglycinediacetic acid | Chelating agent | Chelating agent | 3-7 |
| PEG 8000 | Polyethylene Glycol 8000 | Binder | solvent | 3-7 |
| Neo Defend | Gluconolactone & Sodium Benzoate (GSB) | Preserative | preservative | 25-30 |
| Sipernat 50/PPG Hi-Sil ABS Silica | Silicon dioxide | Carrier for liquid ingredients/flow aid | inert material | 0.1-1.0 |
| Magnesium Stearate | Magnesium Stearate | Lubricate | inert material | 0.1-1.0 |
| Fragrance | n/a | sensorial effect | sensorial effect | 1-4 |
| Dye/colorant | FD&C or polymetric dye | visual effect | visual effect | 0.001-0.01 |
| Total | | | | 100.00 |
| pH | | | | pH 3.5-4.5 |
| Liquid Load (%) | | | | 2.00 |

Example 5

A high pH multi-surface cleanser tablet was produced, using the following ingredients:

TABLE 5

| Raw Materials | Chemistry | Function in tablet | Function in final dilution | Weight (%) |
|---|---|---|---|---|
| Citric Acid | Citric Acid | Acid for effervescent | pH control | 15-19 |
| Sodium Carbonate | Sodium Carbonate Dense | Base for effervescent | Cleaner/pH control | 37-43 |
| Sodium Bicarbonate | Sodium Bicarbonate Grade 5 | Base for effervescent | Cleaner/pH Control | 8-12 |
| Sodium Metasilicate | Sodium Metasilicate anhydrous | pH control | Anti-corrosion inhibitor | 9-13 |
| BASF Lutensol AT 25 | ethoxylated alcohols | Nonionic Surfactant | oily soil remover | 3-7 |
| Trilon-MSG | methylglycinediacetic acid | Chelating agent | Chelating agent | 3-7 |
| PEG 8000 | Polyethylene Glycol 8000 | Binder | solvent | 3-7 |
| Sipernat 50/PPG Hi-Sil ABS Silica | Silicon dioxide | Carrier for liquid ingredients | inert material | 0.1-1.0 |
| Magnesium Stearate | Magnesium Stearate | Lubricate | inert material | 0.1-1.0 |
| Fragrance | n/a | sensorial effect | sensorial effect | 1-3 |
| Dye/colorant | FD&C or polymetric dye | visual effect | visual effect | 0.001-0.01 |
| Total | | | | 100.00 |
| pH | | | | pH 9.5-10.5 |
| Liquid Load (%) | | | | 2.00 |

Example 6

Multi-Surface Tablet size—6.5 g

TABLE 6

| Ingredients | % | Weight (grams) |
|---|---|---|
| Effervescent Ingredients | 45-55% | 3.00-3.60 g |
| Preservatives | 20-30% | 1.50-2.00 g |
| Surfactant, Binder, Lubricant, etc | 15-25% | 1.00-1.60 g |

Example 7

A low pH multi-surface low pH cleanser tablet was produced, using the following ingredients

TABLE 7

| Raw Materials | Chemistry | Function in tablet | Function in final dilution | Weight (%) |
|---|---|---|---|---|
| Citric Acid | Citric Acid | Acid for effervescent | Acidic Cleaner | 27-38 |
| Sodium Carbonate | Sodium Carbonate | Base for effervescent | Cleaner/pH control | 14-25 |
| Sodium Benzoate | Sodium Benzoate | Preservative | Preservative | 10-30 |
| Gluconolactone | Gluconolactone | Preservative booster | Preservative booster | 0-12 |
| Sodium Coco Sulfate | Sodium Coco Sulfate | Anionic Surfactant | cleaner | 6-20 |
| Potassium Sorbate | Potassium Sorbate | preservative booaster | preservative booaster | 4-15 |
| PEG 8000 | Polyethylene Glycol 8000 | Binder | solvent | 0-5 |
| L-leucine | L-leucine | lubricant | | 0-3 |
| Sipernat 50/PPG Hi-Sil ABS Silica | Silicon dioxide | Flow aid | | 0-3.0 |
| Fragrance Lemon APC | Fragrance | scent | | 0-3.0 |
| Bio-Soft N91-8 | Alcohol Ethoxylate C9-C11 8EO | emulsifier | | 0-2 |
| Medium-chain triglycerides Oil | Medium-chain triglycerides Oil | Process aid | | 0-1 |
| Liquitint Bright Yellow | polymeric dye | colorant | | 0-0.1 |
| pH | | | | pH 4.5-5.5 |

Example 8

A low pH bathroom cleanser tablet was produced, using the following ingredients:

TABLE 8

| Raw Materials | Chemistry | Function in tablet | Function in final dilution | Weight (%) |
|---|---|---|---|---|
| Citric Acid | Citric Acid | Acid for effervescent | Acidic Cleaner | 32-40 |
| Sodium Carbonate | Sodium Carbonate Dense | Base for effervescent | Cleaner/pH control | 5-9 |
| Sodium Bicarbonate | Sodium Bicarbonate | Base for effervescent | Cleaner/pH control | 6-10 |
| BASF Lutensol AT 25 | ethoxylated alcohols | Nonionic Surfactant | oily soil remover | 16-20 |
| Trilon-MSG | methylglycinediacetic acid | Chelating agent | Chelating agent | 3-7 |
| PEG 8000 | Polyethylene Glycol 8000 | Binder | solvent | 3-7 |
| Neo Defend | Gluconolactone & Sodium Benzoate (GSB) | Preservative | preservative | 10-16 |
| Sipernat 50/PPG Hi-Sil ABS Silica | Silicon dioxide | Carrier for liquid ingredients | inert material | 3-7 |
| Magnesium Stearate | Magnesium Stearate | Lubricate | inert material | 0.1-1.0 |
| ethoxylated alcohols (liquid) | ethoxylated alcohols C8-C10 6-8 moles of EO | Nonionic Surfactant narrow cut | oily soil remover | 1-3 |
| Fragrance | n/a | sensorial effect | sensorial effect | 1-3 |
| Dye/colorant | FD&C or polymetric dye | visual effect | visual effect | 0.001-0.01 |
| Total | | | | 100.00 |
| pH | | | | pH 3.5-4.5 |
| Liquid Load (%) | | | | 3.00 |

Example 9

A high pH bathroom cleaner tablet was produced, using the following ingredients:

TABLE 9

| Raw Materials | Chemistry | Function in tablet | Function in final dilution | Weight (%) |
|---|---|---|---|---|
| Citric Acid | Citric Acid | Acid for effervescent | pH control | 14-18 |
| Sodium Carbonate | Sodium Carbonate Dense | Base for effervescent | Cleaner/pH control | 35-45 |
| Sodium Bicarbonate | Sodium Bicarbonate Grade 5 | Base for effervescent | Cleaner/pH Control | 6-10 |
| Sodium Metasilicate | Sodium Metasilicate anhydrous | pH control | Anti-corrosion inhibitor | 8-12 |
| BASF Lutensol AT 25 | ethoxylated alcohols | Nonionic Surfactant | oily soil remover | 10-14 |
| Trilon-MSG | methylglycinediacetic acid | Chelating agent | Chelating agent | 3-7 |
| PEG 8000 | Polyethylene Glycol 8000 | Binder | solvent | 4-8 |
| Sipernat 50/PPG Hi-Sil ABS Silica | Silicon dioxide | Carrier for liquid ingredients | inert material | 1-10 |
| Magnesium Stearate | Magnesium Stearate | Lubricate | inert material | 0.1-2.0 |
| ethoxylated alcohols (liquid) | ethoxylated alcohols C8-C10 6-8 moles of EO | Nonionic Surfactant narrow cut | oily soil remover | 1-3 |
| Fragrance | n/a | sensorial effect | sensorial effect | 1-3 |
| Dye/colorant | FD&C or polymetric dye | visual effect | visual effect | 0.001-0.01 |
| Total | | | | 100.00 |
| pH | | | | pH 9.5-10.5 |
| Liquid Load (%) | | | | 3.00 |

Example 10

Bathroom Tablet size—6.5 g

TABLE 10

| Ingredients | % | Weight (grams) |
|---|---|---|
| Effervescent Ingredients | 45-55% | 3.00-3.60 g |
| Preservatives | 20-30% | 1.50-2.00 g |
| Surfactant, Binder, Lubricant, etc | 15-25% | 1.00-1.60 g |

Example 11

A low pH bathroom cleanser tablet was produced, using the following ingredients:

TABLE 11

| Raw Materials | Chemistry | Function in tablet | Function in final dilution | Weight (%) |
|---|---|---|---|---|
| Citric Acid | Citric Acid | Acid for effervescent | Acidic Cleaner | 30-40 |
| Sodium Carbonate | Sodium Carbonate | Base for effervescent | Cleaner/pH control | 10-20 |
| Sodium Benzoate | Sodium Benzoate | Preservative | Preservative | 10-30 |
| Sodium lauryl Sulfate | Sodium Lauryl Sulfate | Anionic Surfactant | cleaner | 2-15 |
| Gluconolactone | Gluconolactone | Preservative booster | Preservative booster | 0-10 |
| Potassium Sorbate | Potassium Sorbate | preservative booaster | preservative booaster | 5-15 |
| Sorbitol | Sorbitol | binder | | 0-5 |
| PEG 8000 | Polyethylene Glycol 8000 | Binder | solvent | 0-5 |
| L-leucine | L-leucine | lubricant | | 0-3 |
| Sipernat 50/PPG Hi-Sil ABS Silica | Silicon dioxide | Flow aid | | 0-3.0 |
| Fragrance Eucalyptus Mint Contcentrated MOD | Fragrance | scent | | 0-3.0 |
| Bio-Soft N91-8 | Alcohol Ethoxylate C9-C11 8EO | emulsifier | | 0-2 |
| Medium-chain triglycerides Oil | Medium-chain triglycerides Oil | Process aid | | 0-2 |
| Liquitint Bright Yellow | polymeric dye | colorant | | 0-0.1 |
| pH | | | | pH 4.0-5.0 |

The cleaning performance of the cleanser formulation described herein are tested by following standard guidelines such as ASTM or CSPA method. The cleaning efficiency of the hand soap formulation described herein are satisfactory: they either outperform or perform comparably to standard formulations.

The foregoing is offered primarily for purposes of illustration. It will be readily apparent to those skilled in the art that the formulations, concentration ranges, and other parameters of the invention described herein may be further modified or substituted in various ways without departing from the spirit and scope of the invention. It is intended, therefore, that the invention be defined by the scope of the claims which follow and that such claims be interpreted as broadly as is reasonable.

The invention claimed is:

1. A stable anhydrous cleanser concentrate formulation in a solid form, comprising an acidic cleaner, a basic cleaner, a first preservative, a second preservative and an anionic surfactant; wherein the first preservative is potassium sorbate, wherein the second preservative is sodium benzoate, wherein said formulation produces a solution with a pH in the range of 7.5 to about 12.5 when dissolved in an appropriate amount of water; wherein the acidic cleaner is present in an amount from about 35% to about 60% by weight, based on the weight of the formulation; and wherein the first preservative and the second preservative are present in an amount from about 15% to about 40% by weight, based on the weight of the formulation.

2. The stable anhydrous cleanser concentrate formulation of claim 1, which is substantially fatty acid free and/or substantially animal fat free.

3. The stable anhydrous cleanser concentrate formulation of claim 1, wherein at least one of the acidic cleaner and the basic cleaner is present in an amount greater than that of the surfactant.

4. The stable anhydrous cleanser concentrate formulation of claim 1, wherein the acidic cleaner and the basic cleaner together are present in an amount greater than that of the surfactant.

5. The stable anhydrous cleanser concentrate formulation of claim 1, wherein the acidic cleaner is present in an amount from about 35% to about 50%, or about 40% to about 45% by weight, based on the weight of the formulation.

6. The stable anhydrous cleanser concentrate formulation of claim 1, wherein the anionic surfactant is selected from sodium coco sulfate and sodium lauryl sulfate.

7. The stable anhydrous cleanser concentrate formulation of claim 1, wherein the acidic cleaner is selected from citric acid and malic acid.

8. The stable anhydrous cleanser concentrate formulation of claim 1, wherein the basic cleaner is present in an amount from about 5% to about 60%, from about 5% to about 30%, from about 10% to about 30%, from about 10% to about 25%, from about 5% to about 10%, from about 40% to about 60%, or from about 35% to about 45%, by weight, based on the weight of the formulation.

9. The stable anhydrous cleanser concentrate formulation of claim 1, wherein the basic cleaner is selected from sodium carbonate, sodium bicarbonate and any other alkali carbonates.

10. The stable anhydrous cleanser concentrate formulation of claim 1, wherein the surfactant is present from about 8% to about 12%, from about 6% to about 20%, from about 16% to about 20%, or from about 10% to about 14% by weight, based on the weight of the formulation.

11. The stable anhydrous cleanser concentrate formulation of claim 1, wherein the first preservative is present in an amount ranging from about 5% to about 11% by weight, based on the weight of the formulation, and wherein the second preservative is present in an amount ranging from about 11% to about 21% by weight, based on the weight of the formulation.

12. The stable anhydrous cleanser concentrate formulation of claim 1, wherein the formulation further comprises a nonionic surfactant.

13. The stable anhydrous cleanser concentrate formulation of claim 12, wherein the nonionic surfactant is selected from ethoxylated alcohol and alkyl polyglucosides.

14. The stable anhydrous cleanser concentrate formulation of claim 1, further comprising a binding agent, wherein the binding agent is selected from polyethylene glycol, sorbitol, and dextrose.

15. The stable anhydrous cleanser concentrate formulation of claim 14, wherein the binding agent is present in an amount ranging from about 0% to about 50%, from about 1% to about 20%, less than about 5%, from about 0% to about 5%, from about 3% to about 7%, or from about 4% to about 8%, by weight, based on the weight of the formulation.

16. The stable anhydrous cleanser concentrate formulation of claim 1, wherein the first preservative and the second preservative are present in an amount ranging from about 15% to about 30% by weight, based on the weight of the formulation.

17. The stable anhydrous cleanser concentrate formulation of claim 1, which is in the form of a tablet.

18. The stable anhydrous cleanser concentrate formulation of claim 1, which is in the form of powder.

19. A method of preparing a tablet, comprising blending homogeneously the stable anhydrous cleanser concentrate formulation according to claim 1 to form a mixture and compressing the mixture to form the tablet.

20. A method of using the stable anhydrous cleanser concentrate formulation according to claim 17 comprising (1) filling a spray bottle or vessel with the appropriate amount of water, (2) adding the tablet to the water-filled spray bottle or vessel, and (3) dissolving the tablet in the appropriate amount of water.

* * * * *